US006942916B2

(12) United States Patent
Bezenek et al.

(10) Patent No.: US 6,942,916 B2
(45) Date of Patent: Sep. 13, 2005

(54) INKJET PRINTABLE ELECTROLUMINESCENT MEDIA

(75) Inventors: Myron A. Bezenek, San Marcos, CA (US); Eric L. Burch, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/758,745

(22) Filed: Jan. 11, 2001

(65) Prior Publication Data

US 2002/0090495 A1 Jul. 11, 2002

(51) Int. Cl.[7] ................................................ B32B 27/14

(52) U.S. Cl. ........................ 428/195; 428/690; 428/704; 428/917; 313/504; 313/506

(58) Field of Search ................................ 428/690, 195, 428/917, 704, 913; 313/504, 506

(56) References Cited

U.S. PATENT DOCUMENTS

| | | | | | |
|---|---|---|---|---|---|
| 4,208,869 | A | | 6/1980 | Hanaoka | 368/84 |
| 5,005,306 | A | | 4/1991 | Kinstler | 40/591 |
| 5,336,345 | A | | 8/1994 | Gustafson et al. | 156/67 |
| 5,444,930 | A | | 8/1995 | Loew | 40/544 |
| 5,485,145 | A | | 1/1996 | Sniff | 340/815.4 |
| 5,683,166 | A | | 11/1997 | Lutzker | 362/84 |
| 5,707,722 | A | | 1/1998 | Iqbal et al. | 428/304.4 |
| 5,779,346 | A | | 7/1998 | Burke | 362/84 |
| 5,780,965 | A | | 7/1998 | Cass et al. | 313/506 |
| 5,932,355 | A | | 8/1999 | Iqbal et al. | 428/447 |
| 5,989,687 | A | | 11/1999 | Li | 428/195 |
| 6,027,115 | A | * | 2/2000 | Griswold et al. | 273/143 R |
| 6,338,892 | B1 | * | 1/2002 | McCue et al. | 428/195 |
| 6,352,748 | B1 | * | 3/2002 | Aylward et al. | 428/14 |
| 6,419,987 | B1 | * | 7/2002 | Bauer et al. | 427/302 |

FOREIGN PATENT DOCUMENTS

| | | | |
|---|---|---|---|
| CN | 1064463 | A | 9/1992 |
| CN | 1072778 | A | 6/1993 |
| EP | 0736393 | A1 | 10/1996 |
| EP | 0767072 | A1 | 4/1997 |
| JP | 4-320486 | | 11/1992 |
| JP | 5-295361 | | 11/1993 |
| JP | 6-267658 | | 9/1994 |
| JP | 8-12967 | | 1/1996 |
| JP | 8-111288 | | 4/1996 |
| JP | 8-171989 | | 7/1996 |
| JP | 8-250279 | | 9/1996 |
| JP | 2000208279 | | 7/2000 |
| JP | 2001277490 | | 10/2001 |
| WO | WO98/22388 | | 5/1998 |

OTHER PUBLICATIONS

E–Lite Technologies Inc., Architectural Lighting, pp. 1–2, No Date.

BKL Inc, Data sheet re Screen Printed El Lamps with IC Type or Magnetic Resonating Transformer Type Inverters, 4 pages, No Date.

BKL Inc, Data sheet re Proto–Kut TM Demonstration Kit, BKL Form #50a, Revision Nov. 6, 1997. 1 page.

BKL Inc, Data sheet re Proto–Kut TM—Cut–to–fit prototyping panel P/N H9000Kxxx application notes, BKL Form #48, Revised Oct. 2, 1997. 1 page.

* cited by examiner

*Primary Examiner*—Deborah Jones
*Assistant Examiner*—Ling Xu

(57) ABSTRACT

An electroluminescent media assembly that can be fed into an inkjet printer and is capable of recording high quality images. The media assembly includes an electroluminescent substrate for generating light, and an ink receiving layer. The media assembly can also include feedability controlling layers. Intermediate adhesion layers or adhesion treatments can also be employed. Electrical contacts are provided to make the correct electrical connection to the assembly to excite the electroluminescence characteristics.

37 Claims, 3 Drawing Sheets

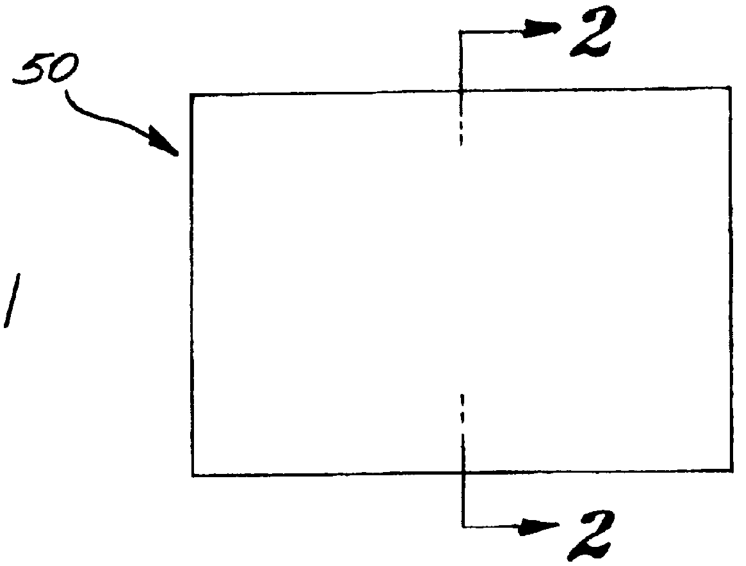
FIG. 1
FIG. 2
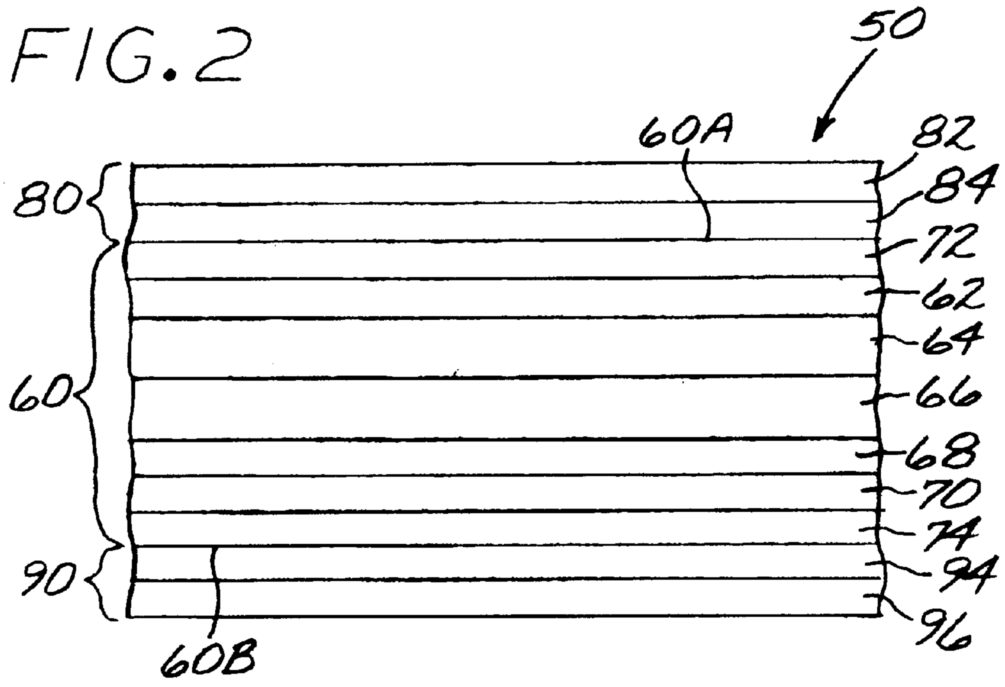

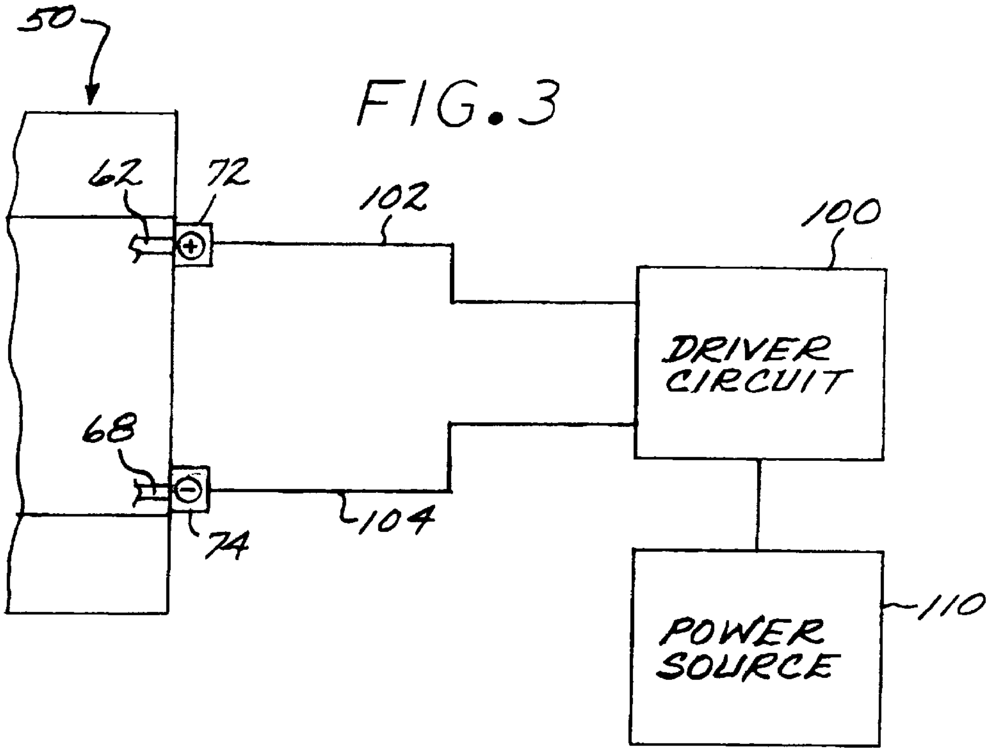
FIG. 3
FIG. 4
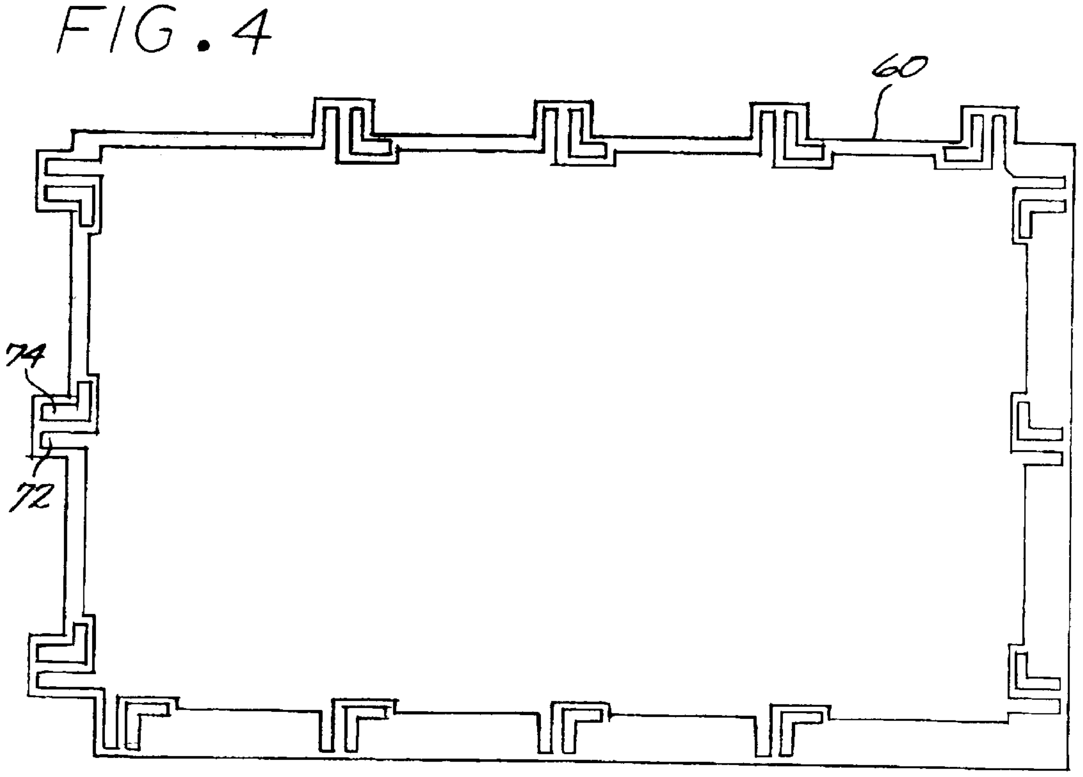

INKJET PRINTABLE ELECTROLUMINESCENT MEDIA

TECHNICAL FIELD OF THE INVENTION

This invention relates to printable media used in printing engines such as inkjet printers.

BACKGROUND OF THE INVENTION

Inkjet printing systems are in widespread use today. Ink jet printers print dots by ejecting very small drops of ink onto a print medium. In one typical application, a movable carriage supports one or more printheads each having ink ejecting nozzles. The carriage traverses over the surface of the print medium, and the nozzles are controlled to eject drops of ink at appropriate times pursuant to command of a microcomputer or other controller, wherein the timing of the application of the ink drops is intended to correspond to the pattern of pixels of the image being printed.

Color ink jet printers commonly employ a plurality of printheads, for example four, mounted in the print carriage to produce different colors. Each printhead contains ink of a different color, with the commonly used colors being cyan, magenta, yellow, and black.

Printing devices, such as inkjet printers, use printing ink to print text, graphics, images, etc. onto print media. The print media may be of any of a variety of different types, sizes, side-specific coatings, etc. For example, the print media may include paper, transparencies, envelopes, photographic print stock, cloth, plastic, vinyl, special material, etc.

SUMMARY OF THE INVENTION

An electroluminescent media adapted for inkjet printing is described. An exemplary embodiment includes an electroluminescent substrate for generating light when excited by electrical drive signals, the substrate having a generally planar surface. An ink receiving layer is applied to the first surface, which allows recording of images during an inkjet printing process. The ink receiving layer is preferably transparent or translucent. A printer feedability controlling layer can optionally be applied to the second surface of the substrate to facilitate feeding the media through the inkjet printer.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 is a top plan view of an electroluminescent inkjet printable medium in accordance with the invention.

FIG. 2 is a schematic cross-sectional view taken along line 2—2 of FIG. 1.

FIG. 3 is a simplified schematic diagram of an exemplary electrical circuit arrangement for driving the electroluminescent media of the present invention.

FIG. 4 is a bottom view of an electroluminescent substrate which may be used in the assembly of FIG. 1.

DETAILED DESCRIPTION OF THE PREFERRED EMBODIMENTS

Figure 5:
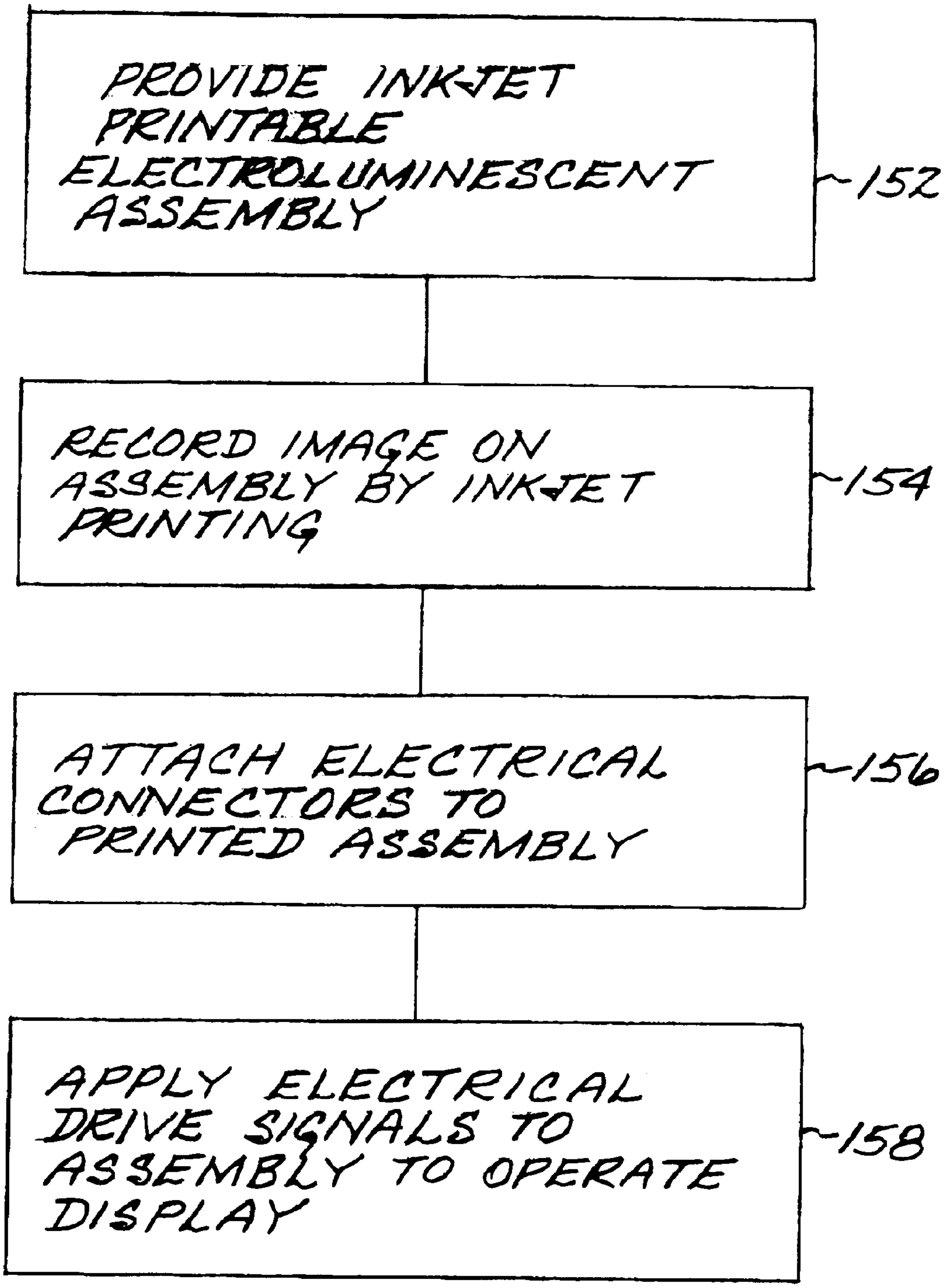
FIG. 5 is a flow diagram illustrating a technique for fabricating and operating an electroluminescent display in accordance with an aspect of the invention.

An exemplary embodiment of an electroluminescent inkjet printable medium in accordance with the invention is illustrated in FIGS. 1 and 2. As shown in the top plan view of FIG. 1, the medium 50 is in the form of a sheet in a rectilinear shape, sized to feed through an inkjet printer. FIG. 2 is a schematic cross-sectional view taken along line 2—2 of FIG. 1, and illustrates the structure of the medium 50. In a general sense, the medium comprises an electroluminescent substrate 60 having a top surface 60A and a bottom surface 60B. An inkjet coating 80 is applied to the top surface 60A of the substrate 60, and receives the ink droplets ejected by the inkjet printing system to record thereon an image.

A feature of the coating 80 in a preferred embodiment is that it is a translucent or transparent coating, allowing illumination light generated by the substrate 60 to backlight the coating 80.

The substrate 60 includes, in an exemplary embodiment, a plurality of layers assembled together. The layers include a cathode layer 62, a dielectric layer 64, a phosphor layer 66, an anode layer 68, and a polyester film layer 70. Top and bottom water impervious protective layers 72, 64 can be applied to the cathode layer 62 and the film 70, respectively, if needed for particular substrate embodiments or applications. The inkjet coating layer 80 is applied to the top layer of the substrate 60. Electroluminescent substrates suitable for the purpose as substrate 60 are commercially available, and include the substrate systems marketed by BKL, Inc., 421 Feheley Drive, King of Prussia, Pa. 19406, as the Proto-Kut prototyping panel, for use with the Proto-Kut demonstration kit.

The inkjet coating 80 includes in an exemplary embodiment a multi-layer composite, including an inkjet receptive top layer 82, and an adhesive enhancer layer 84, which can represent either a material layer or a process step. For example, the adhesive enhancer layer 84 can be a material layer which bonds layer 82 to the substrate 60. Exemplary materials which can be employed for layer 82 include gelatins and acrylics. Alternatively, the layer 84 can represent a process to bond the layer 82 to the substrate 60, e.g. a corona treatment that oxidizes the surface of the substrate 60.

Inkjet coatings suitable for use in the fabrication of the media 50 are known in the art. One exemplary transparent coating suitable for the layer 82 is described in U.S. Pat. No. 5,989,687. Another exemplary transparent coating suitable for layer 82 is the inkjet printable coating on the transparency films marketed by Hewlett-Packard Company (HP) as part number C3834A, HP Premium Inkjet Transparency Film. These transparent coatings should have haze according to ASTM D1003 of less than 20%, and preferably less than 10%, with light transmission according to ASTM D1003 greater than 80%, and preferably greater than 90%. A translucent coating suitable for the purpose is the coating on the film marketed in roll form by HP as part number C6778A, HP Colorlucent Backlit UV.

The inkjet coating 80 can be applied or attached to the substrate 60 by any suitable method for applying coatings to substrates. For example, many suitable coating techniques are described in *Modern Coating and Drying Technology*, edited by Edward Cohen and Edgar Gutoff, Wiley-VCH, 1992, e.g. Chapter 1, at pages 1–10, including slot coating, Meyer-rod coating and gravure coating processes. The coating material is applied in a liquid form to the top of the substrate 60, and dried or cured as part of the coating process.

An optional layer 90 can be applied to the bottom surface 60B of the electroluminescent substrate 60, to facilitate feeding the coated substrate through an inkjet printer. The outer facing layer 96 is optionally adhered to the bottom surface 60B of the substrate by an adhesive enhancer represented by layer 94, which can be a layer of material such as a gelatin or acrylic, or a process for adhering the layer 96 to surface 60B. The outer layer 96 is a friction controlling surface or material. For example, the layer 96 can be a material used to reduce friction, such as wax or polyfluorinated polymers such as TEFLON (TM). Alternatively, the layer 96 can be used to increase friction, such as hydrophilic materials such as gelatin or polyvinyl alcohol.

In one exemplary embodiment, the electroluminescent substrate 60 has a thickness on the order of 250 microns, the inkjet coating 80 has a thickness on the order of 15 microns, and the back coat layer 90 has a thickness on the order of 1–10 microns.

The possible constructions of an inkjet printable electroluminescent media in accordance with the invention include the following. The electroluminescent substrate 60 is assembled to the inkjet coated substrate 80. The electroluminescent material can have on its backside a modification layer such as coating 90 to ensure the feedability of the assembly through the printing system.

Alternatively, the electroluminescent panel can be assembled first, and then subsequently applying both the inkjet receiving layers and feedability layers to the panel.

In all cases the necessary electrical contacts are defined to make the correct electrical connection to the assembly to excite the electroluminescence characteristics.

In operation, the media 50 is fed into the inkjet printer, either in sheet form or from a supply roll. While the media is fed under the control of the printer the printer creates the desired image using inkjet inks. After the creation of the image, the appropriate electrical connectors are applied using tooling. These connectors allow for the connection of the necessary voltages and drive frequencies to drive the panel to light the image for display.

Thus, the electroluminescent medium 50 is configured to be passed through an inkjet printing system, and an image printed on the outer surface of the inkjet coating 80. Once the medium 50 has exited the printing system, electrical leads can be attached to the terminals which are provided on the substrate 60 for connecting the electrical driver circuit for powering the substrate. FIG. 3 is a simplified schematic diagram of an exemplary electrical circuit arrangement. Terminals 72 and 74 are electrically attached to the respective cathode and anode layers 62, 68 of the substrate 60. A driver circuit 100 is connected to the terminals via wiring 102, 104. The driver circuit 100 is connected to a power source 110. The details of the driver circuit and power source will depend on the requirements for the particular electroluminescent substrate 60. For example, for relatively small substrates, e.g. having a 5 inch by 8 inch lit area, a low voltage circuit can be used, and can be powered by a battery source. Relatively large substrates can be powered by a higher voltage circuit. The driver circuit in an exemplary application converts DC voltage into a AC output for driving the substrate 60. Driver circuits suitable for the purpose are commercially available.

FIG. 4 is a bottom view of an electroluminescent substrate which may be used in the assembly of FIG. 1. The terminals to which the electrical leads are attached are schematically illustrated here.

FIG. 5 is a flow diagram illustrating a technique for fabricating and operating an electroluminescent display in accordance with an aspect of the invention. The inkjet printable substrate is provided at step 152, having an inkjet printable coating applied to one surface thereof. Next, at step 154, an image is recorded on the coated substrate, using an inkjet printing technique. For example, the coated substrate may be passed through an inkjet printer/plotter, having a traversing carriage carrying printhead for ejecting multiple colors of ink droplets in a controlled manner on the substrate. After the image has been recorded on the substrate, at step 156, electrical connectors or leads are attached to the substrate to permit application of electrical drive signals. The display can then be operated (step 158) by applying the drive signals using a battery power source or a corded power supply connected to line power.

Thus, an electroluminescent assembly is described that can be fed into an inkjet printer and is capable of having high quality images printed on it. The assembly comprises an electroluminescent substrate for inkjet receiving layers and feedability controlling layers. The assembly can use intermediate adhesion layers or adhesion treatments in addition to the inkjet and feed controlling layers.

The invention can be employed in various applications, including providing relatively small backlit images such as photographs, or larger backlit images used in many different applications. Exemplary battery-powered and/or power cord- powered applications include custom imaged night-lights, custom imaged outdoor lights (e.g. family photographs, holiday scenes, etc.), stand-alone signage and displays that do not have access to power cords (such as point-of-sale displays), custom imaged directional signage/displays with battery backup in the case of power outages, and interior decoration such as custom imaged wall panels. The invention allows direct imaging of complex and photographic quality images for display. In the past, by contrast, electroluminescent panels have been used as the light source only and then an additional overlay with the image to be displayed/projected is created and assembled to the panels. The media in accordance with an aspect of this inventions is feedable in inkjet printers to enable imaging. Improved image quality is provided because the image is a part of the assembly and directly in contact with the light emitting substrate. This optimizes the light's ability to illuminate the ink by reducing or eliminating scatter. Lower cost is achieved because the number of parts is reduced. Lower energy is required to achieve high quality images because the light does not have to go through an airspace and an additional substrate that is holding the image to be lighted/projected. Moreover, a display employing this invention can have longer life because the amount of energy needed to achieve the same image intensity is lower.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An electroluminescent image recording media adapted for inkjet printing, including:

an electroluminescent substrate for generating light when excited by electrical drive signals, the substrate having at least one generally planar surface;

an ink receiving layer applied to the surface, the ink receiving layer for recording images applied as the media is passed through an inkjet printing system during an inkjet printing process; and a printer feedability controlling layer applied to a second surface of said substrate which is opposite the first surface of said substrate to facilitate feeding the media through an inkjet printer.

2. The media of claim 1, further comprising electrical contacts to make an electrical connection to the electroluminescent substrate to excite electroluminescence characteristics of the substrate.

3. The media of claim 1, wherein the ink receiving layer is transparent or translucent to permit some light generated by the electroluminescent substrate to pass through the ink receiving layer.

4. The media of claim 3, wherein the ink receiving layer has a light transmission characteristic greater than 80%.

5. The media of claim 3, wherein the ink receiving layer has a light transmission characteristic greater than 90%.

6. The media of claim 1, wherein the ink receiving layer is bonded to the substrate.

7. The media of claim 1, wherein the printer feedability controlling layer comprises a friction-reducing material.

8. The media of claim 7, wherein the friction-reducing material comprises wax or a polyfluorinated polymer.

9. The media of claim 1, wherein the printer feedability controlling layer comprises a friction-increasing material.

10. The media of claim 9, wherein the friction-increasing material comprises a hydrophilic material.

11. The media of claim 9, wherein the friction-increasing material comprises gelatin or polyvinyl alcohol.

12. The media of claim 1, wherein said image receiving layer is free of an ink-jet recorded image, and said media is in an as-yet-unprinted state.

13. An electroluminescent media for recording inkjet printed images, including:

a thin flat substrate for generating light when excited by electrical drive signals, the substrate having first and second opposed generally planar surfaces;

an ink receiving layer applied to the first surface, the ink receiving layer for recording images applied during an inkjet printing process when the media assembly is fed through the inkjet printer; and a printer feedability controlling layer applied to the second surface of said substrate.

14. The media of claim 13, further comprising electrical contacts to make an electrical connection to the electroluminescent substrate to excite electroluminescence characteristics of the substrate.

15. The media of claim 13, wherein the ink receiving layer is transparent or translucent to permit some light generated by the electroluminescent substrate to pass through the ink receiving layer.

16. The media of claim 13, wherein the ink receiving layer is bonded to the substrate.

17. The media of claim 13, wherein the printer feedability controlling layer comprises a friction-reducing material.

18. The media of claim 13, wherein the printer feedability controlling layer comprises a friction-increasing material.

19. The assembly of claim 13, wherein the printer feedability controlling layer comprises a friction-increasing material.

20. The media of claim 13, wherein said image receiving layer is free of an ink-jet recorded image, and said media is in an as-yet-unprinted state.

21. An electroluminescent media assembly adapted for use as an inkjet printing media to receive droplets of ink during an inkjet printing process, comprising:

a thin, inkjet printer feedable, electroluminescent substrate for generating light when excited by electrical drive signals;

an ink droplet receiving layer assembled to a surface of the substrate;

the substrate configured and adapted for feeding through an inkjet printer during the printing process for receiving the droplets of ink; and a printer feedability controlling layer applied to a second surface of said substrate opposite the surface to which the ink droplet receiving layer is assembled to facilitate feeding the media through the inkjet printer.

22. The assembly of claim 21 wherein the layer is free of inkjet printed images when the layer is assembled to the substrate surface.

23. The assembly of claim 21, further comprising electrical contacts to make an electrical connection to the electroluminescent substrate to excite electroluminescence characteristics of the substrate.

24. The assembly of claim 21, wherein the ink receiving layer is transparent or translucent to permit some light generated by the electroluminescent substrate to pass through the ink receiving layer.

25. The assembly of claim 24, wherein the ink receiving layer has a light transmission characteristic greater than 80%.

26. The assembly of claim 24, wherein the ink receiving layer has a light transmission characteristic greater than 90%.

27. The media assembly of claim 21, wherein the ink droplet receiving layer is bonded to the substrate.

28. The assembly of claim 21, wherein the printer feedability controlling layer comprises a friction-reducing material.

29. The media of claim 21, wherein said image receiving layer is free of an ink-jet recorded image, and said media is in an as-yet-unprinted state.

30. An electroluminescent media for recording inkjet printed images, including:

a thin flat substrate for generating light when excited by electrical drive signals, the substrate having first and second opposed parallel surfaces; and a transparent or translucent ink receiving layer assembled to the first surface, the ink receiving layer having an outer surface for receiving ink droplets on an area of the ink receiving layer which is free of preformed images during an inkjet printing process when the media assembly is fed through the inkjet printer; and a printer feedability controlling layer applied to the second surface of said substrate.

31. The media of claim 30, further comprising electrical contacts to make an electrical connection to the electroluminescent substrate to excite electroluminescence characteristics of the substrate.

32. The media of claim 30, wherein the ink receiving layer has a light transmission characteristic greater than 80%.

33. The media of claim 30, wherein the ink receiving layer has a light transmission characteristic greater than 90%.

34. The media of claim 30, wherein the ink receiving layer is bonded to the substrate.

35. The media of claim 30 wherein the printer feedability controlling layer comprises a friction-reducing material.

36. The media of claim 30, wherein the printer feedability controlling layer comprises a friction-increasing material.

37. The media of claim 28, wherein said image receiving layer is free of an ink-jet recorded image, and said media is in an as-yet-unprinted state.

* * * * *